United States Patent [19]
Coultas

[11] Patent Number: 5,226,667
[45] Date of Patent: Jul. 13, 1993

[54] PERCUSSION IGNITER ASSEMBLY

[75] Inventor: Terrance J. Coultas, Canyon Country, Calif.

[73] Assignee: TRW Vehicle Safety Systems Inc., Lyndhurst, Ohio

[21] Appl. No.: 769,202

[22] Filed: Sep. 30, 1991

Related U.S. Application Data

[63] Continuation-in-part of Ser. No. 671,947, Mar. 19, 1991.

[51] Int. Cl.⁵ .............................................. B60R 21/32
[52] U.S. Cl. ...................................... 280/734; 280/736
[58] Field of Search ................ 280/728, 731, 732, 734, 280/736, 741; 102/204

[56] References Cited

U.S. PATENT DOCUMENTS

| | | |
|---|---|---|
| Re. 28,624 | 11/1975 | Lewis et al. |
| 2,660,952 | 12/1953 | Mohaupt |
| 2,926,607 | 3/1960 | Muller, Jr. et al. ................ 102/530 |
| 3,356,025 | 12/1967 | Duncan |
| 3,618,523 | 11/1971 | Hiquera et al. ..................... 102/204 |
| 3,638,964 | 2/1972 | Chute |
| 3,723,205 | 3/1973 | Scheffee |
| 3,731,843 | 5/1973 | Anderson, Jr. ........................ 222/3 |
| 3,877,721 | 4/1975 | Brown, Jr. |
| 3,948,176 | 4/1976 | Koomen |
| 3,966,226 | 6/1976 | Roth ..................................... 280/737 |
| 4,386,567 | 6/1983 | Ciccone et al. ................... 102/202.5 |
| 4,573,706 | 3/1986 | Breed ................................... 280/734 |
| 4,694,755 | 9/1987 | Ibarra ................................... 102/445 |
| 4,711,466 | 12/1987 | Breed ................................... 280/241 |
| 4,856,433 | 8/1989 | Evans ................................... 102/530 |
| 4,981,534 | 1/1991 | Scheffe ................................ 149/19.1 |

Primary Examiner—Kenneth R. Rice
Attorney, Agent, or Firm—Tarolli, Sundheim & Covell

[57] ABSTRACT

An igniter assembly for a vehicle occupant safety apparatus includes an ignitable material, a plurality of primer elements, and a single impact member. A housing having a hermetic seal contains the ignitable material, the primer elements, and the impact member. The ignitable material initiates burning of a combustible material in the safety apparatus when the ignitable material is ignited. The primer elements are actuatable to ignite the ignitable material in response to the application of force against the primer elements. The impact member is movable to apply force against the primer element to actuate the primer elements in response to an impact force applied to the housing.

9 Claims, 7 Drawing Sheets

PERCUSSION IGNITER ASSEMBLY

The present patent application is a continuation-in-part of patent application Ser. No. 671,947 filed Mar. 19, 1991.

FIELD OF THE INVENTION

The present invention relates to an igniter assembly for a vehicle occupant safety apparatus including an inflatable vehicle occupant restraint, such as an air bag.

BACKGROUND OF THE INVENTION

A vehicle occupant safety apparatus including an inflatable air bag is disclosed in U.S. Pat. No. 3,723,205. The safety apparatus includes a container which holds air under pressure. The safety apparatus also includes a gas generating material and an igniter for igniting the gas generating material. The igniter is an electrically actuated squib. When the air bag is to be inflated, the squib is electrically actuated to ignite the gas generating material. As the gas generating material burns, the pressure in the container is increased due to the gases and heat provided by burning of the gas generating material. When a predetermined elevated pressure is reached, a burst disc is ruptured to enable gas to flow from the container to the air bag.

SUMMARY OF THE INVENTION

The present invention is a new and improved igniter assembly for a vehicle occupant safety apparatus including containing means for receiving gas and a combustible material which burns to heat the gas. The igniter assembly in accordance with the invention comprises an ignitable material, a plurality of primer elements and an impact member. The ignitable material, the primer elements and the impact member are contained in a housing having a hermetic seal. The ignitable material initiates burning of the combustible material when the ignitable material is ignited. The primer elements are actuatable to ignite the ignitable material in response to the application of force against the primer elements. The impact member is movable to apply force against the primer elements to actuate the primer elements in response to an impact force applied to the housing.

In a preferred embodiment of the invention, the impact member has surface means for applying force to each of the primer elements simultaneously. Preferably, the primer elements are arranged in a circular array, and the impact member has an annular impact surface movable against the primer elements. The preferred embodiment of the igniter assembly also includes a base structure for supporting the primer elements. The base structure has a base surface including a recess into which the annular surface on the impact member is movable. The recess in the base surface has first portions which are arranged in a circular array and which contain the primer elements. The recess also has second portions which have arcuate shapes and which extend circumferentially between the first portions. The annular surface on the impact member is movable into the recess in the base structure. The annular surface is also movable into a position in which the base surface limits movement of the impact member against the primer elements. The base surface thus prevents the impact member from puncturing the primer elements and thereby prevents an aft or rearward flow of gas from the containing means through the primer elements.

BRIEF DESCRIPTION OF THE DRAWINGS

The foregoing and other objects and features of the present invention will become more apparent to one skilled in the art upon a consideration of the following description of the invention and the accompanying drawings, in which.

DESCRIPTION OF PREFERRED EMBODIMENTS OF THE INVENTION

General Description

Figure 1:
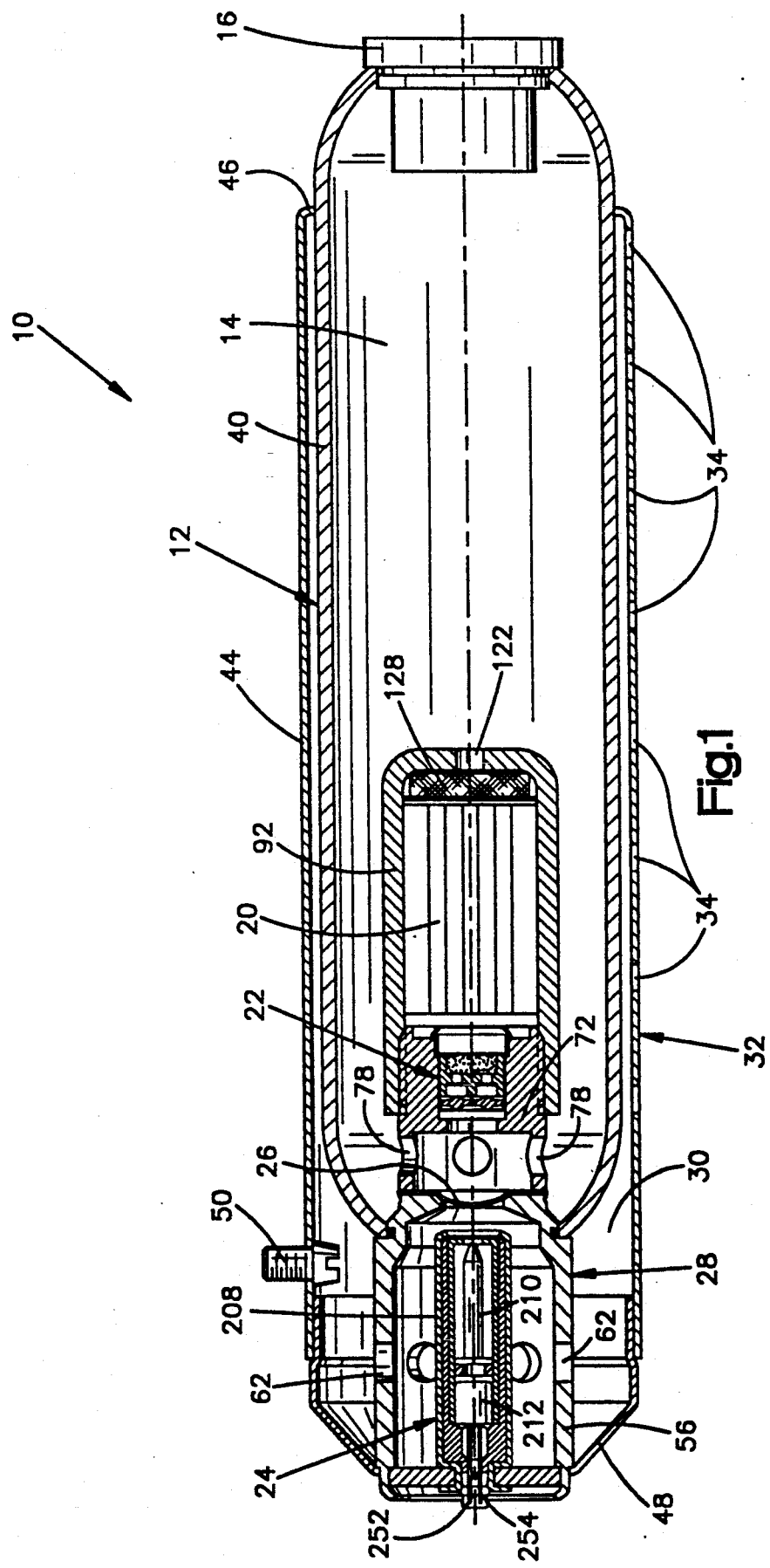
FIG. 1 is a sectional view of a vehicle occupant safety apparatus including an igniter assembly constructed in accordance with the present invention.

A vehicle occupant safety apparatus is shown in FIG. 1. The safety apparatus is an inflator assembly 10 for inflating a vehicle occupant restraint, such as an air bag. The inflator assembly 10 includes a generally cylindrical container 12, a generally cylindrical diffuser 32, and a manifold assembly 28. The manifold assembly 28 is secured to one end of the container 12 by a friction weld and projects both axially into and axially away from the container 12. The diffuser 32 is larger in diameter than the container 12 and is mounted to encircle both the container 12 and the manifold assembly 28. The diffuser 32 also extends substantially the entire length of the manifold assembly 28 and a significant portion of the length of the container 12.

The container 12 defines a generally cylindrical chamber 14. The chamber 14 is filled with gas under pressure which is introduced into the chamber through an end cap 16. The end cap 16 extends through an opening at an end of the container 12 opposite from the manifold assembly 28 and is connected to the container 12 by a friction weld. The end cap 16 includes a passage (not shown) through which the gas is conducted into the chamber 14. Once the chamber 14 has been filled with gas at a desired pressure, the passage is closed. The end cap 16 also includes a conventional pressure switch (not shown) from which gas pressure in the chamber 14 can be monitored to alert a passenger in a vehicle if the pressure in the chamber 14 drops below a set pressure.

The stored gas is preferably argon. The argon gas is preferably stored in the container 12 at a pressure of approximately 2,000 to 3,500 psi. The container 12 could be used, however, to store other gases at different pressures. For example, the container 12 could be used to store air or nitrogen.

The container 12 includes a generally cylindrical one-piece steel wall 40 which defines the chamber 14. The one-piece steel wall 40 may have a length of approximately 230 millimeters, an outside diameter of approximately 59 millimeters, and a thickness of approximately 2.5 millimeters. It should be understood that the foregoing specific dimensions for the wall 40 have been set forth herein for purposes of clarity of description. It is contemplated that the inflator assembly 10 may be constructed with dimensions and materials which are substantially different from the foregoing.

The diffuser 32 is mounted on the outside of the container 12. The diffuser 32 includes a cylindrical diffuser tube 44 having an annular, radially inwardly directed lip 46 at one end. The lip 46 tightly engages a cylindrical outer side surface of the wall 40. An end cap 48 is welded to the end of the diffuser tube 44 opposite from the inturned lip 46. The end cap 48 is connected to an outer end portion of the manifold assembly 28. A mounting stud 50 is connected with the diffuser tube 44 adjacent the end cap 48. The mounting stud 50 is used to mount the inflator assembly 10 to a reaction can which can be mounted at a desired location in a vehicle.

The manifold assembly 28 extends through the wall 40 of the container 12 at the end of the container opposite the end cap 16. The portion of the manifold assembly 28 within the container 12 supports a body 20 of ignitable pyrotechnic material and an igniter assembly 22. The igniter assembly 22 is actuated to ignite the body 20 of pyrotechnic material. The portion of the manifold assembly outside the container 12 supports an actuator assembly 24. Between the actuator assembly 24 and the igniter assembly 22 is a burst disk 26 which seals the container 12.

Upon the sensing of sudden vehicle deceleration, the actuator assembly 24 is actuated to release the stored gas from the chamber 14 and to actuate the igniter assembly 22. When actuated, the actuator assembly 24 ruptures the metal burst disk 26 to release the stored gas from the chamber 14. Thereafter, the actuator assembly 24 actuates the igniter assembly 22 to ignite the body 20 of pyrotechnic material. As the body 20 of pyrotechnic material burns, the gas in the chamber 14 is heated and added to by the hot gases produced by the combustion of the body of heat generating material to increase the pressure of the gas.

Upon rupturing of the burst disk 26, gas flows from the chamber 14 through the manifold assembly 28. The gas flows from the manifold assembly 28 into a chamber 30 formed by the diffuser 32 and the outer walls of the manifold assembly and the container 12. The diffuser 32 has openings 34 through which gas is directed to the air bag.

Manifold Assembly

The manifold assembly 28 (FIG. 2) includes a generally cylindrical metal manifold plug 56 which is disposed partially outside of the container 12. The manifold plug 56 is hollow and has a generally cylindrical interior cavity 58. Circular outlet openings 62 are disposed in a circular array in a cylindrical side wall 64 of the manifold plug 56. One end of the manifold plug 56 extends through the container wall 40 from outside of the container 12 and is friction welded to the wall 40.

The burst disk 26 extends across a circular opening 60 at the end of the manifold plug 56 which is presented to the interior of the container 12. The burst disk 26 is secured to the manifold plug 56 and blocks a flow of gas from the chamber 14 until the burst disk is ruptured by the actuator assembly 24. The burst disk 26 has a circular domed or bulged central portion 260. The central portion 260 is preferably divided into six equal segments by score lines which extend radially outwardly from the center of the burst disk. When the burst disk 26 is ruptured, the segments will tend to flatten axially outwardly against a frustoconical inner side surface 262 of the manifold plug 56 and form a relatively large opening in the burst disk 26.

The outer end of the manifold plug 56 is closed by a circular end wall 68. The actuator assembly 24 is mounted on the end wall 68. The end wall 68 supports the actuator assembly 24 with its longitudinal central axis coincident with central axes of the manifold plug cavity 58, the circular opening 60, and the burst disk 26. The diameter and length of the actuator assembly 24 are sufficiently smaller than the diameter and length of the cavity 58 that gas can flow from the chamber 14 and through the cavity 58 to the openings 62 when the burst disk 26 is ruptured.

Figure 2:
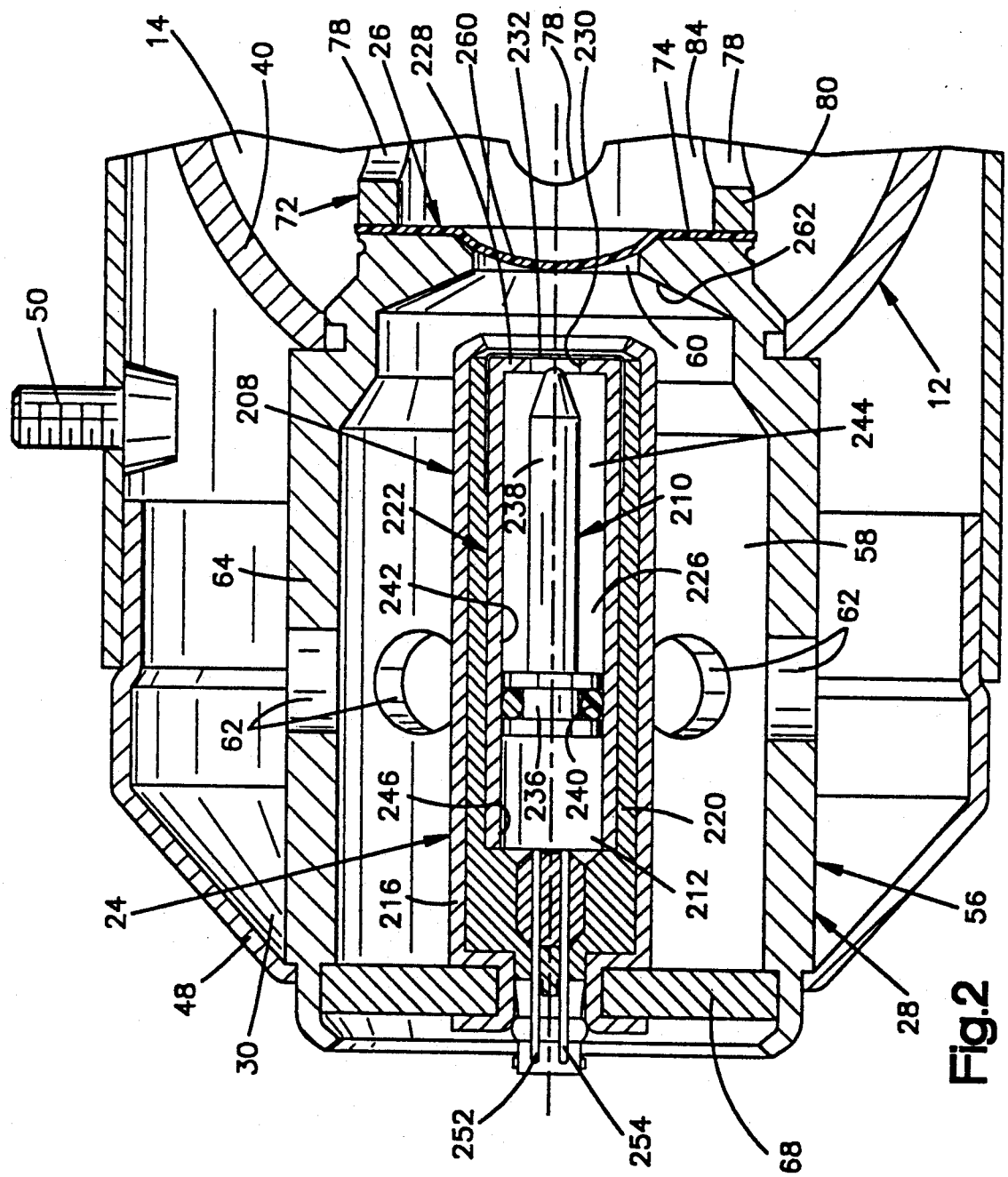
FIG. 2 is an enlarged partial sectional view of a portion of the apparatus of FIG. 1.

The manifold assembly 28 also includes a hollow cylindrical metal igniter holder 72 (FIGS. 2 and 3A) which is coaxial with the manifold plug 56 and is disposed in the container 12. The igniter holder 72 is tungsten inert gas (TIG) welded to the burst disk 26 and thus to the inner end of the manifold plug 56 (FIG. 2). The circular burst disk 26 has a flat annular rim portion 74 which extends between the inner end of the manifold plug 56 and the outer end of the igniter holder 72. The manifold plug 56, igniter holder 72 and rim portion 74 of the burst disk 26 are all tungsten inert gas welded together to form the unitary manifold assembly 28.

A plurality of circular inlet openings 78 (FIGS. 2 and 3A) are arranged in a circular array in a side wall 80 of the igniter holder 72. The openings 78 provide fluid communication between the chamber 14 and a generally cylindrical cavity 84 in the igniter holder 72. The burst disk 26 blocks fluid flow from the cavity 84 into the manifold plug 56 until the burst disk is ruptured by the actuator assembly 24.

The igniter assembly 22 (FIG. 3A) is mounted in a cylindrical chamber 86 formed in the end of the igniter holder 72 opposite the burst disk 26. The chamber 86 is connected in fluid communication with the chamber 84 through a circular opening 88. The chamber 86 and circular opening 88 are coaxial with the burst disk 26 (FIG. 2) and the actuator assembly 24.

Main Pyrotechnic Material

A generally cylindrical metal housing 92 (FIG. 3A) encloses the body 20 of pyrotechnic material. One end of the housing 92 is disposed adjacent the igniter holder 72 and has a threaded, interior circumferential surface. The threaded surface of the housing 92 engages a threaded, exterior circumferential surface on the igniter holder 72 to mount the housing on the inner end of the igniter holder. The housing 92 is coaxial with the chamber 86 and the igniter assembly 22 in the igniter holder 72.

Figure 3A:
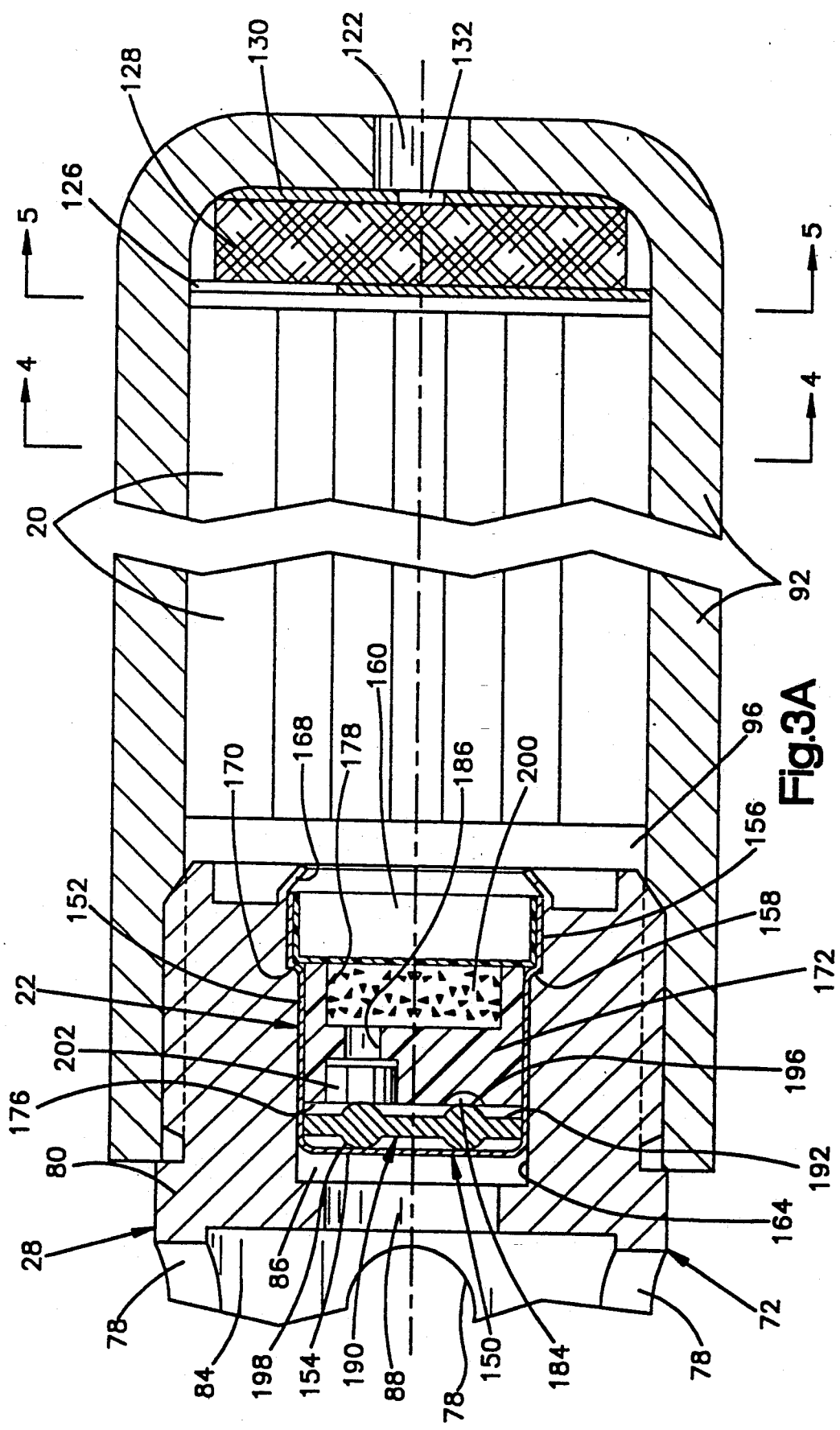
FIG. 3A is an enlarged partial sectional view, on a somewhat larger scale than that of FIG. 2, of another portion of the apparatus of FIG. 1.

The body 20 of pyrotechnic material is disposed in a cylindrical chamber 96 within the housing 92 (FIG. 3A). The housing 92 supports the body 20 of pyrotechnic material in a coaxial relationship with the igniter assembly 22. The coaxial relationship facilitates ignition of the body 20 of pyrotechnic material upon actuation of the igniter assembly 22.

Figure 4:
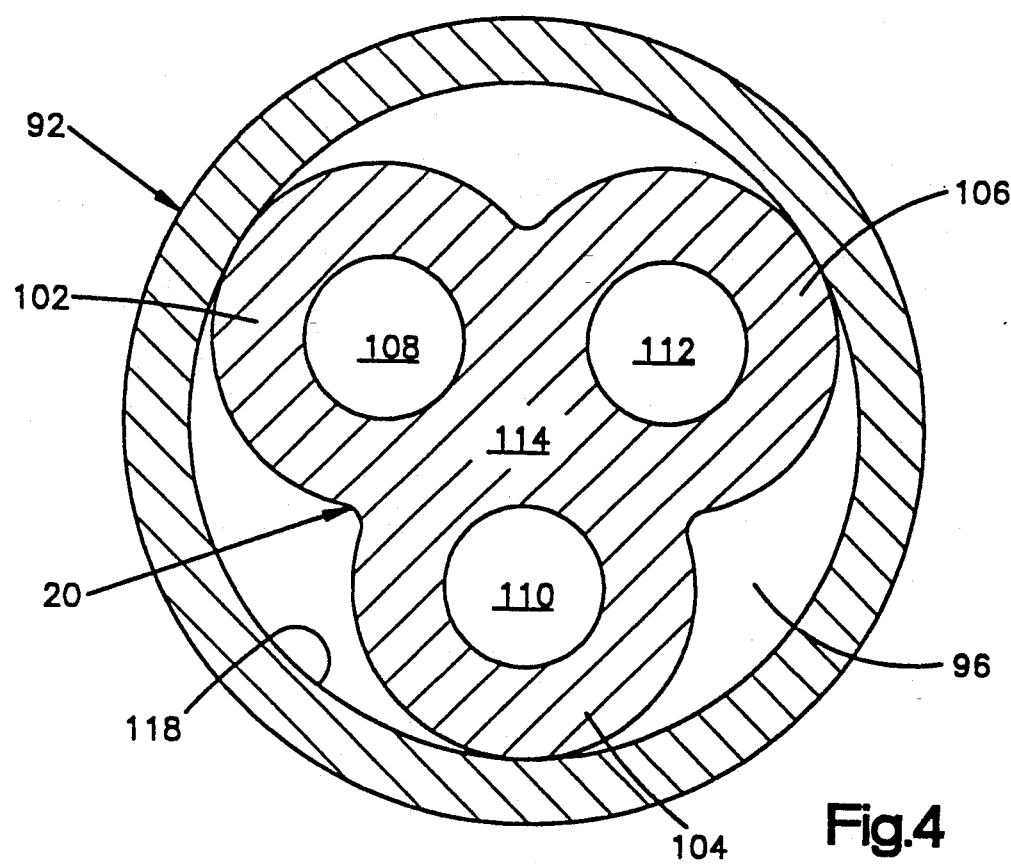
FIG. 4 is a sectional view, taken on line 4—4 of FIG. 3A.

The body 20 of pyrotechnic material has a three-lobed cross sectional configuration (FIG. 4). Specifically, the body 20 of pyrotechnic material has lobes 102, 104 and 106 which extend throughout the axial extent of the body of pyrotechnic material. Straight cylindrical passages 108, 110 and 112 extend parallel to each other and axially through respective lobes 102, 104, and 106 in the body 20 of pyrotechnic material. The lobes 102, 104, 106 and passages 108, 110, 112 are disposed in a circular array about a solid central portion 114 of the body 20 of pyrotechnic material. The lobes 102, 104, 106 of the body 20 of pyrotechnic material have an interference fit with a cylindrical inner side surface 118 of the housing 92 to support the body 20 of pyrotechnic material firmly in the cylindrical housing chamber 96.

By providing the body 20 of pyrotechnic material with the internal passages 108, 110 and 112, the body 20 of pyrotechnic material will have a slightly progressive burn characteristic. Specifically, as the body 20 of pyrotechnic material is burned, the rate of generation of heat and gas slightly increases. This is because, as the body 20 of pyrotechnic material burns, the total surface area of the body which is burning increases slightly. The area of the outer side surface of the body 20 of pyrotechnic material decreases while the area of the surfaces of the passages 108-112 increases. The body 20 of pyrotechnic material could be configured to have different burning characteristics if desired.

At its end opposite from the manifold assembly 28 (FIG. 3A), the housing 92 is substantially closed except for a circular orifice 122. The orifice 122 is disposed in a coaxial relationship with the housing chamber 96 and igniter assembly 22. The orifice 122 connects the inside of the housing chamber 96 in fluid communication with the chamber 14 in the container 12 (FIG. 1). The orifice 122 is continuously open so that the gas which is stored in the chamber 14 can flow into the housing chamber 96 around the body 20 of pyrotechnic material.

Figure 5:
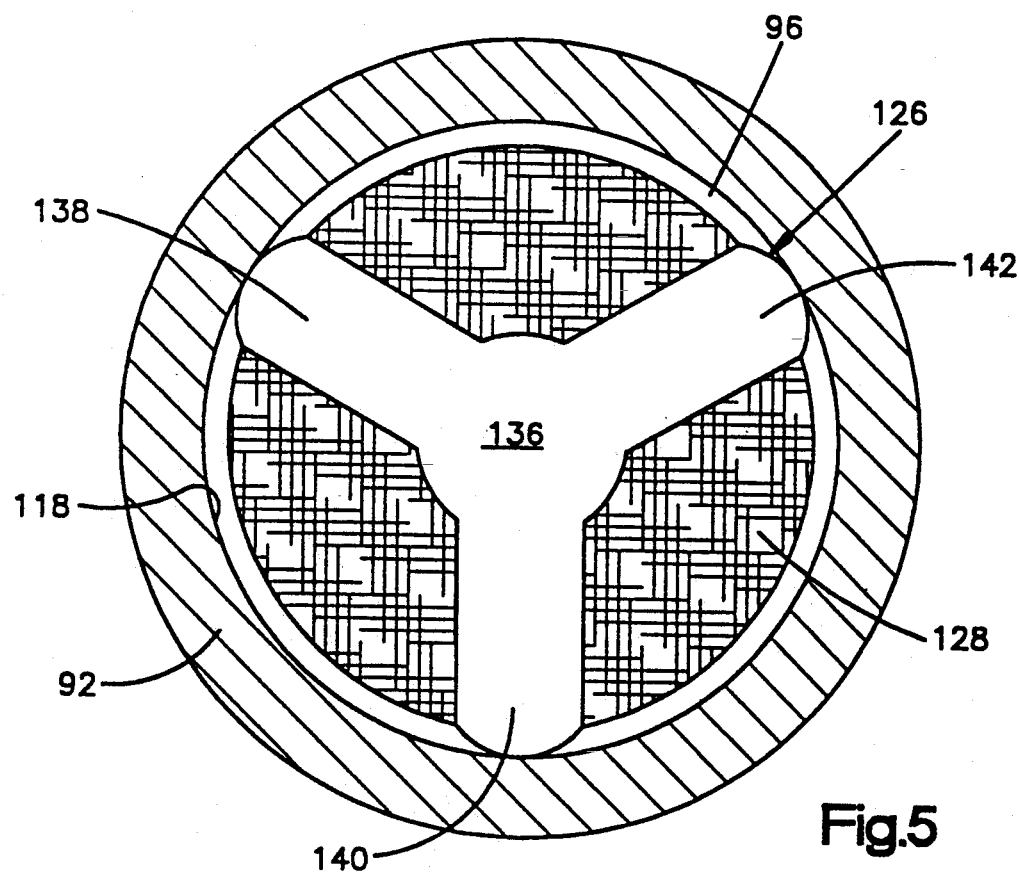
FIG. 5 is a sectional view, taken on line 5—5 of FIG. 3A.

Disposed between the body 20 of pyrotechnic material and the orifice 122 are a flat baffle plate 126 (FIGS. 3A and 5), a circular screen 128, and a flat circular orifice plate 130. The baffle plate 126 is closest to the body 20 of pyrotechnic material. The baffle plate 126 includes three arms 138, 140, and 142 which extend radially outwardly from a central portion 136 of the baffle plate 126 into engagement with the inner side surface 118 of the housing 92. The screen 128 engages the surface of the baffle plate 126 opposite the body 20 of pyrotechnic material. The orifice plate 130 is disposed between the screen 128 and the housing orifice 122.

The orifice plate 130 has a relatively small circular central orifice 132 which is disposed in a coaxial relationship with the housing orifice 122, the baffle plate 126 and the body 20 of pyrotechnic material. The orifice 132 is smaller in diameter than the circular orifice 122 in the housing 92. The orifice plate 130 may be formed of carbon steel and may have a thickness of approximately 0.15 millimeters. The diameter of the orifice 132 in the plate 130 may be approximately two millimeters.

During burning of the body 20 of pyrotechnic material, a flow of combustion products from the pyrotechnic material impinges against the baffle plate 126. The baffle plate 126 provides a tortuous path in the housing 92 for the combustion products, and thus some particles may be trapped in the housing 92. After they pass the baffle plate 126, the combustion products flow through the screen 128, the orifice 132 in the orifice plate 130 and the housing orifice 122 into the chamber 14. Also, during burning of the body 20 of pyrotechnic material, a flame is conducted through the orifice 132 in the orifice plate 130 and the housing orifice 122 into the chamber 14.

During initial burning of the pyrotechnic material 20, the opening 132 of relatively small area in the orifice plate 130 restricts the flow of combustion products from the housing chamber 96. This causes the pressure and temperature in the housing chamber 96 to increase in such a manner as to promote burning of the body 20 of pyrotechnic material.

As the body 20 of pyrotechnic material continues to burn, the flow of hot combustion products and flame through the orifice 132 in the orifice plate 130 heats the orifice plate and tends to melt the material of the orifice plate. The pressure applied by the hot combustion products against the orifice plate 130 deforms the orifice plate at the unsupported portion around the orifice hole to increase the diameter of the orifice 132 to the same diameter as the housing orifice 122. Specifically, the diameter of the orifice 132 may increase from two millimeters to about six millimeters. Thus, the area of opening 132 in the orifice plate 130 becomes approximately equal to the area of the housing orifice 122.

Although the body 20 of pyrotechnic material could have many different compositions, in one specific embodiment of the invention, the body of pyrotechnic material had the following composition:

| % By Weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Also, the body 20 of pyrotechnic material could have different sizes and shapes. In one specific embodiment, the body 20 of pyrotechnic material had a shape as shown in FIGS. 3 and 4, an axial length of 42 millimeters, and a weight of about 28 grams. The passages 108, 110, 112 had a diameter of about 6 millimeters, and the outer tips of the lobes 102, 104, 106 laid on a circle about 27 millimeters in diameter. This body 20 of pyrotechnic material had the foregoing composition. When the body was ignited, it burned for approximately 44 milliseconds at a temperature of about 4,000 F. The length of time for which a body 20 of pyrotechnic material burns and the temperature which is obtained will depend upon the mass, shape and specific composition of the body 20 of pyrotechnic material.

Igniter Assembly

Figure 3B:
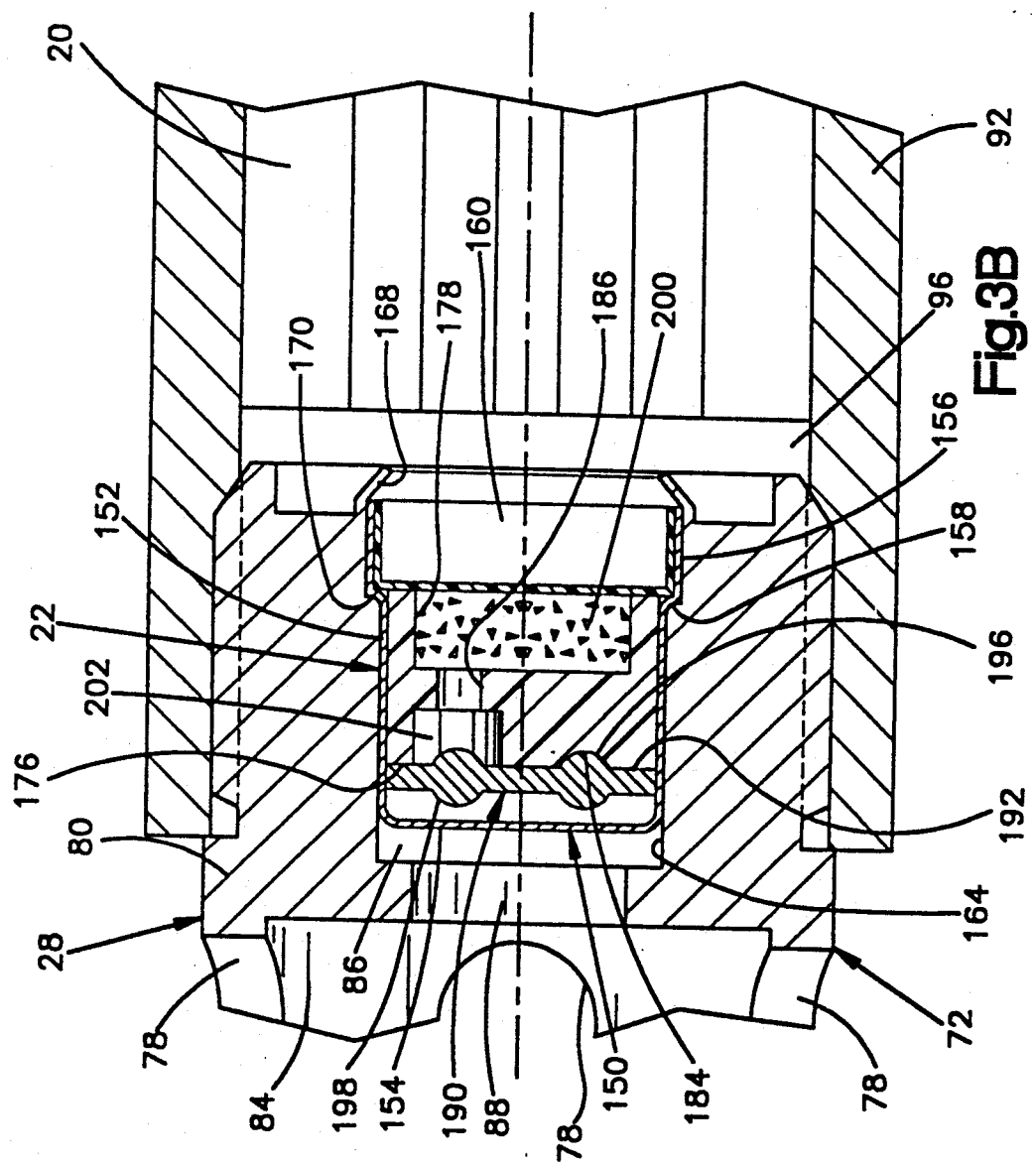
FIG. 3B is a view of a portion of the apparatus shown in FIG. 3A, with parts shown in different positions.

As previously described, the igniter assembly 22 is actuatable to ignite the body 20 of pyrotechnic material. The igniter assembly 22 has a sheet metal housing 150 (FIGS. 3A and 3B). The sheet metal housing 150 is relatively thin and is readily deformed. The sheet metal housing 150 has a cylindrical main section 152 which extends axially outwardly from a circular end wall 154. A cylindrical outer end section 156 of the housing 150 is connected with the main section 152 by a radially extending annular shoulder 158. A cylindrical end cap 160 extends into the outer section and abuts the shoulder 158. The housing 150 is closed with a hermetic seal. A hermetic seal may be defined as a seal which has an equivalent helium leak rate of less than $1 \times 10^{-6}$ cubic centimeters per second of helium at one atmosphere pressure differential measured at a specified temperature between $-50°$ C. and $110°$ C.

The cylindrical main section 152 of the igniter housing 150 engages a cylindrical inner surface 164 of the chamber 86 in the igniter holder 72. An annular flange 168 projecting from the igniter holder 72 is crimped over the outer end section 156 of the igniter housing 150 to hold the igniter assembly 22 in place in the chamber 86. The igniter housing shoulder 158 engages an annular shoulder 170 on the igniter holder 72 to help locate the igniter assembly 22 axially in the chamber 86 and to prevent the crimping operation from compressing the ignition materials in the igniter assembly.

Figure 6:
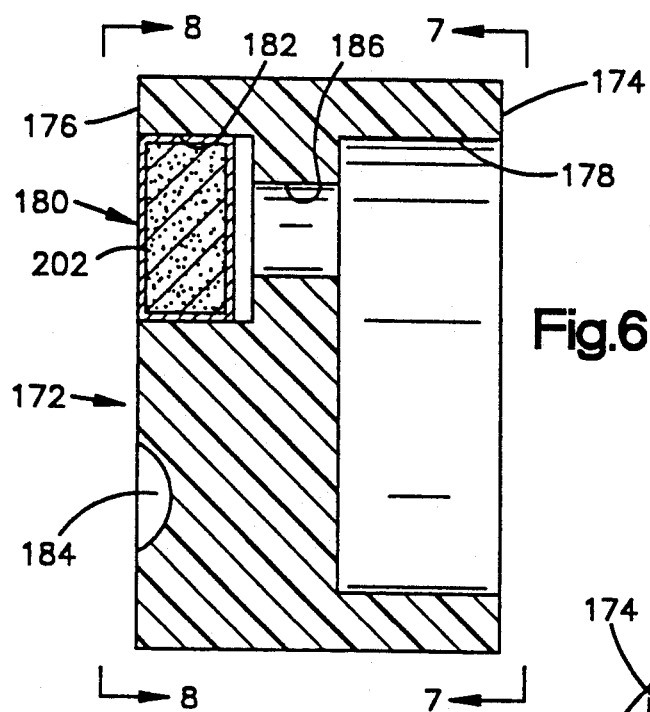
FIG. 6 is a sectional view of a part of the apparatus of FIG. 1.
Figure 7:
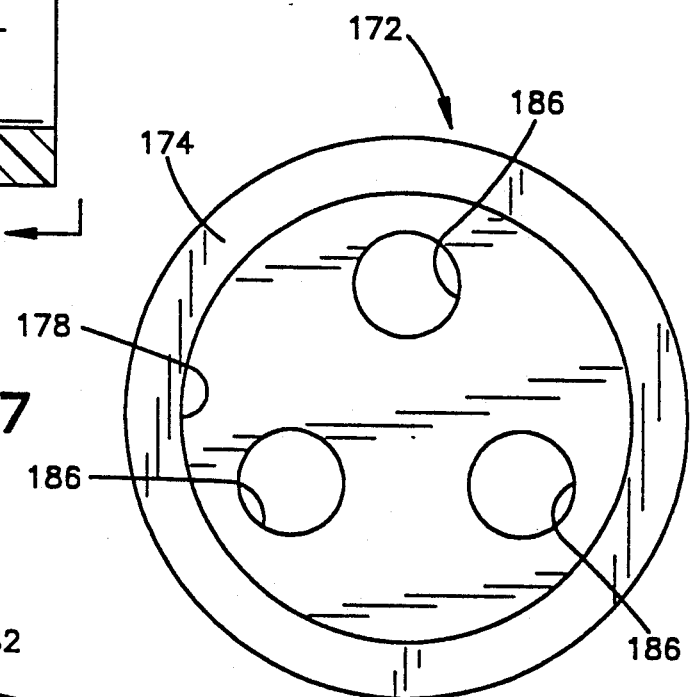
FIG. 7 is a view taken on line 7—7 of FIG. 6.
Figure 8:
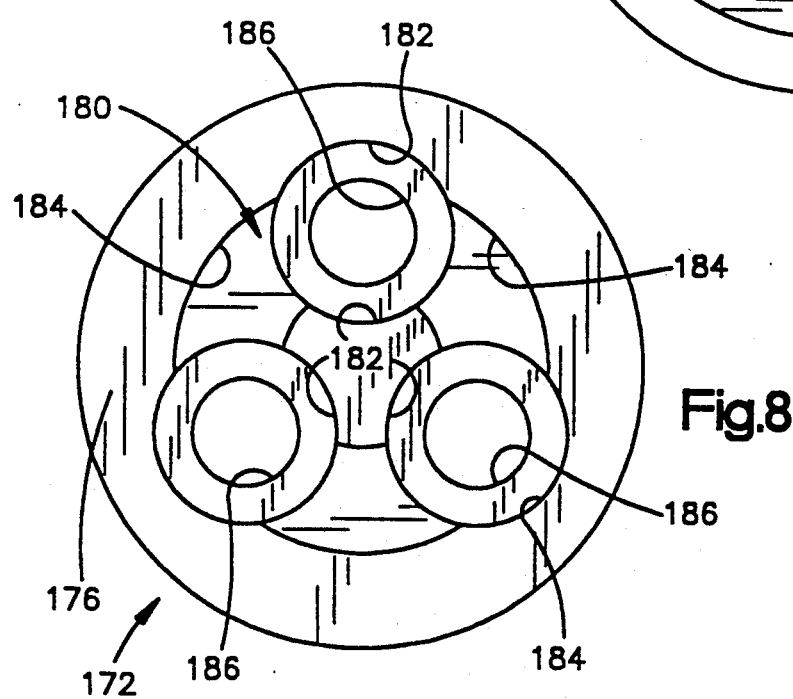
FIG. 8 is a view taken on line 8—8 of FIG. 7.

A generally cylindrical base 172 is contained within and fixed in the igniter housing 150. As best shown in FIGS. 6-8, the base 172 has a planar front side surface 174 and a planar rear side surface 176. A cylindrical recess 178 extends into the base 172 from the front side surface 174. Another recess 180 extends into the base 172 from the rear side surface 176. The recess 180 has three cylindrical portions 182, which are arranged in a circular array, and three arcuate portions 184, which extend circumferentially between adjacent cylindrical portions 182. The cylindrical portions 812 are deeper, measured from the rear side surface 176, than the arcuate portions 184. Each of the cylindrical portions 182 of the recess 180 at the rear side of the base 172 communicates with the cylindrical recess 178 at the front side of the base 172 through a respective passage 186.

An ignition material 200 is contained in the cylindrical recess 178 at the front side of the base 172. The ignition material 200 is preferably $BKNO_3$, but could have a different composition if desired. The ignition material 200 is protected from moisture by the hermetic seal that closes the housing 150. Cylindrical primers 202 are contained in the cylindrical portions 182 of the recess 180 at the rear side of the base 172. The primers 202 are percussion primers, which are actuated by the application of force to the primers. The rear ends of the primers 202 are flush with the planar rear side surface 176 of the base 172. A greater or lesser number of primers 202 could be used, but since the primers 202 are in parallel, each additional primer increases the reliability of deployment on demand.

Figure 9:
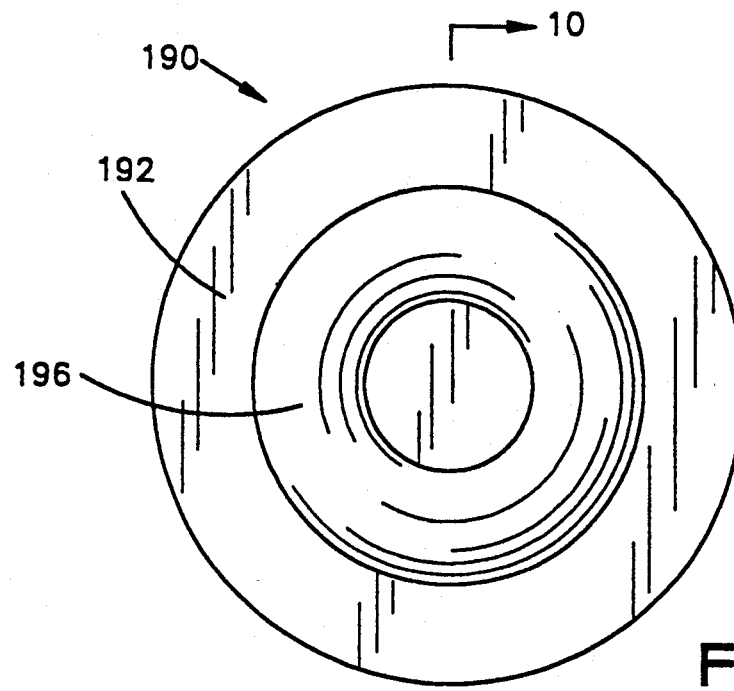
FIG. 9 is a front view of another part of the apparatus of FIG. 1.
Figure 10:
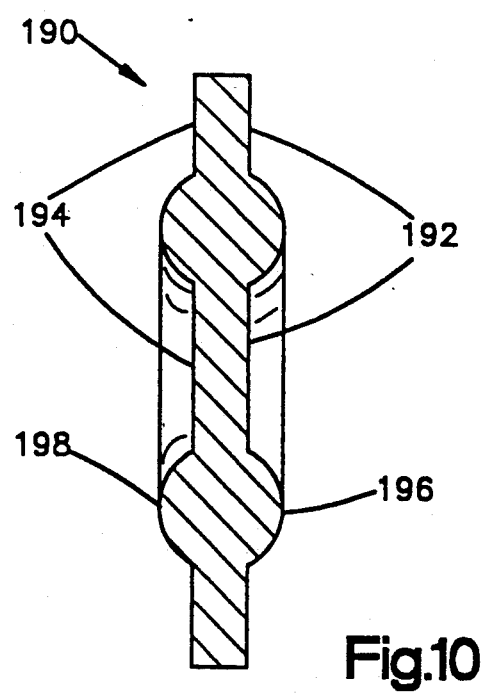
FIG. 10 is a sectional view taken on line 10—10 of FIG. 9.

An impact member 190 is also contained within the igniter housing 150. As best shown in FIGS. 9 and 10, the impact member 190 is a circular plate having a planar front side surface 192 and a planar rear side surface 194. An annular projection 196 centered on the impact member 190 extends in a forward direction from the front side surface 192. Another annular projection 198 extends in a rearward direction from the rear side surface 194, and is coaxial with the annular projection 196 at the front side surface 192. The annular projection 196 has a cross-sectional shape complementary to the shape of the arcuate recess portions 184. Moreover, the height of the annular projection 196, measured from the front side surface 192, is equal to the depth of the arcuate recess portions 184 measured from the rear side surface 176 on the base 172. The impact member 190 is thus shaped to take the position shown in FIG. 3B. When the impact member 190 is in the position shown in FIG. 3B, the front side surface 192 on the impact member 190 abuts the rear side surface 176 on the base 172. Additionally, circumferentially spaced surface portions of the annular projection 196 abut the surfaces of the base 172 in the arcuate recess portions 184.

The impact member 190 is located in the igniter housing 150 between the primers 202 and the end wall 154 of the igniter housing 150. The annular projection 198 at the rear side of the impact member 190 abuts the rear wall 154 of the igniter housing 150. The annular projection 196 at the front side of the impact member 190 abuts all three of the primers 202. Because the front and rear annular projections 196 and 198 are coaxial and centered on the impact member 190, the impact member 190 can be located in the housing 150 with either one of the projections 196 and 198 facing the primers 202. Assembly of the apparatus is thus simplified by the design of the impact member 190.

In operation of the igniter assembly 22, the impact member 190 functions as a firing pin for the primers 202. Upon movement of the impact member 190 toward the primers 202, all of the primers 202 are simultaneously actuated as the annular projection 196 moves against the primers 202. Specifically, circumferentially spaced surface portions of the annular projection 196 which abut respective ones of the primers 202 move simultaneously and equally against the primers 202. Upon actuation of the primers 202, heat and flame produced by the primers 202 are conducted to the ignition material 200 through the passages 186 to ignite the ignition material 200. The ignition material 200, in turn, rapidly burns at a relatively high temperature to generate heat and flame. The heat and flame generated by the ignition material 200 rupture the cylindrical end cap 160, and initiate burning of the body 20 of pyrotechnic material.

Movement of the impact member 190 against the primers 202 is limited by the base 172. When the impact member 190 reaches the position shown in FIG. 3B, the planar front side surface 192 on the impact member 190 moves into abutting contact with the planar rear side surface 176 on the base 172. At the same time, circumferentially spaced surface portions of the annular projection 196, which are located between the primers 202, move into abutting contact with the surfaces of the base 172 in the three arcuate recess portions 184. The rear side surface 176 and the surfaces in the recess portions 184 thus limit movement of the impact member 190 against the primers 202. Because movement of the impact member 190 against the primers 202 is limited, the impact member 190 will not puncture the primers 202. If the primers 202 were punctured, an aft or rearward flow of gas could occur through the primers 202.

Actuator Assembly

The actuator assembly 24 (FIG. 2) is operable to rupture the burst disk 26 and to actuate the igniter assembly 22. The actuator assembly 24 includes a cylindrical housing 208 in which an actuator member 210 and pyrotechnic charge 212 are disposed in a coaxial relationship. The housing 208 includes a generally cylindrical metal outer housing member 216, a cylindrical casing 220, and an inner housing member 222. The outer housing member 216 is secured to the end wall 68 of the manifold plug 56 and is disposed in a coaxial relationship with the burst disk 26, the igniter assembly 22 and the body 20 of pyrotechnic material. The casing 220 is disposed within the outer housing member 216 and extends around the cylindrical metal inner housing member 222. The casing 220 electrically insulates the metal inner housing member 222 from the metal outer housing member 216. As shown, the casing 220 is formed of glass reinforced nylon. However, the casing 220 may be made of a variety of engineered resins.

The inner housing member 222 forms a cylinder chamber 226 in which the actuator member 210 and the pyrotechnic charge 212 are disposed. The inner housing member 222 has an annular end flange 228 which defines a circular opening 230 to the cylinder chamber 226. The circular opening 230 is blocked by a cylindrical end cap 232 formed by a thin layer of plastic film. The end cap 232 extends across the end flange 228 and the opening 230 and along the cylindrical outer side surface of the inner housing member 222. The end cap 232 electrically insulates the outer end portion of the metal inner housing member 222 and closes the opening 230.

The actuator member 210 is formed from a single piece of metal. The actuator member 210 includes a cylindrical head end portion 236 from which a cylindrical rod portion 238 extends. The cylindrical rod portion 238 has a pointed tip. The rod portion 238 is disposed in a coaxial relationship with the circular opening 230 at the end of the inner housing member 222 and with the opening 60 and burst disk 26. An annular 0-ring 240 is disposed on the head end portion 236 and engages and seals against a cylindrical inner side surface 242 of the inner housing member 222. Together, the head end portion 236 and the Oring 240 cooperate to divide the outer chamber 226 into a rod end portion 244 and a head end portion 246.

The pyrotechnic charge 212 is disposed in the head end portion 246 of the cylinder chamber 226. The portion of the pyrotechnic charge 212 generally opposite the head end portion 236 of the actuator member 210 contacts an electrically conductive resistance wire (not shown). The resistance wire is connected to the adjacent ends of two electrically conductive pins 252 and 254. The pins 252 and 254 extend out of the cylinder chamber 226, through the casing 220, and through an opening in the end of the outer housing member 216 adjacent the wall 68. The pins 252 and 254 provide a path for electrical current to heat the resistance wire and ignite the pyrotechnic charge 212. The pyrotechnic charge 212 may be zirconium potassium perchlorate or BKN0$_3$ or, if desired, a different chemical composition.

Operation

Upon the occurrence of sudden vehicle deceleration, a deceleration sensor (not shown) of known construction completes an electrical circuit to permit electrical current to flow to the pins 252 and 254 of the actuator assembly 24. The electrical current transmitted to the pins 252 and 254 causes the resistance wire to heat up and thereby ignite the pyrotechnic charge 212. The gas generated by burning of the pyrotechnic charge 212 pushes against the head end portion 236 of the actuator member 210 to move the actuator member in the cylinder chamber 226. Movement of the actuator member 210 causes its rod end portion to move through the circular opening 230 and pierce the end cap 232. The tip of the rod end portion 238 of the actuator member 210 strikes at or near the center of the burst disk 26. The force applied against the burst disk 26 by the pointy tip on the actuator member 210 ruptures the burst disk. The fluid pressure in the container 12 then deforms the burst disk 26 axially outwardly as the stored gas escapes from the chamber 14.

The unheated gas in the container chamber 14 flows from the chamber through the manifold inlet openings 78 to the chamber 84 in the igniter holder 72. The gas then flows through the opening in the burst disk 26, around the rod end portion 238 of the actuator member 210, and into the cavity 58 in the manifold plug 56. From the manifold plug cavity 58, the gas flows through the openings 62 into the diffuser chamber 30. The gas flows from the diffuser chamber 30 through the openings 34 to an air bag.

After rupturing the burst disk 26, the actuator member 210 continues to move axially under the influence of the pyrotechnic charge 212. The leading end of the actuator member 210 strikes the end wall 154 of the housing 150 (FIG. 3A) of the igniter assembly 22. The impact force applied by the actuator member 210 against the end wall 154 of the housing 150 moves the end wall 154 against the annular projection 198 at the rear side of the impact member 190. The impact member 190 is thus moved toward the primers 202. The impact force applied by the annular projection 196 at the front side of the impact member 190 against the primers 202 simultaneously actuates all three primers 202.

Actuation of the primers 202 results in the ignition material 200 being ignited. If for some unforeseen reason, one of the primers 202 should fail to actuate, the other primers 202 are sufficient to cause the ignition material 200 to ignite. In fact, actuation of only one of the primers 202 is sufficient to ignite the ignition material 200. Upon being ignited, the ignition material 200 burns very rapidly to form hot combustion products. These combustion products rupture the cylindrical end cap 160, and flow toward and ignite the body 20 of pyrotechnic material. When the body 20 of pyrotechnic material initially begins to burn, the orifice disk 130 restricts fluid flow from the housing chamber 96 so that the temperature and pressure in the housing chamber 96 increase. The increased temperature and pressure in the housing chamber 96 promotes burning of the body 20 of pyrotechnic material.

When the leading end of the actuator member 210 strikes the end wall 154 of the housing 150 (FIG. 3A), the leading end of the actuator member 210 may puncture the end wall 154. If the end wall 154 were punctured, it could not block an aft flow of gas which would decrease the temperature and pressure in the housing chamber 96. However, because the base 172 prevents the impact member 190 from puncturing the primers 202, an aft flow of gas is blocked by the primers 202.

As the body 20 of pyrotechnic material begins to burn, hot combustion products and flame flow around the baffle plate 126, through the screen 128, through the orifice 132, and through the housing orifice 122 into the chamber 14 containing the stored gas. During burning of the body 20 of pyrotechnic material, the temperature in the chamber 96 reaches approximately 4,000 F. This relatively high temperature is more than sufficient to enable the hot combustion products and flame to melt the orifice plate 130 partially and increase the diameter of the orifice 132 to the same diameter as the housing orifice 122.

The flame and hot combustion products heat the gas in the chamber 14. As the gas in the chamber 14 is heated, fluid pressure in the chamber increases. This results in an increased rate of flow of gas through the manifold assembly 28 to the diffuser 32 and from the diffuser 32 into the inflatable occupant restraint.

In one specific embodiment of the invention, prior to operation of the actuator assembly 24, the fluid pressure in the chamber 14 was approximately 3,000 psi. Upon rupturing of the burst disk 26 by the actuator member 210, a flow of unheated gas from the chamber 14 caused the fluid pressure in the container 12 to decrease to approximately 2,500 psi. Actuation of the igniter assembly 22 and burning of the body 20 of pyrotechnic material resulted in the gas in the chamber 14 being heated to increase the pressure in the chamber to about 6,000 psi. Thus, the burning of the body 20 of pyrotechnic material was sufficient to cause the fluid pressure in the chamber 14 to increase substantially from its original pressure even though a portion of the gas had been released from the chamber. This results in a relatively large flow of gas to expand the occupant restraint.

From the above description of the invention, those skilled in the art will perceive improvements, changes and modifications. Such improvements, changes and modifications within the skill of the art are intended to be covered by the appended claims.

Having described the invention, the following is claimed:

1. An igniter assembly for initiating burning of a combustible material, said igniter assembly comprising:
   an ignitable material for initiating burning of the combustible material when said ignitable material is ignited;
   a plurality of primer elements which are actuatable to ignite said ignitable material in response to the application of force against said primer elements;
   an impact member which is movable to apply force against said primer elements to actuate said primer elements, said impact member having an annular surface for applying force to each of said primer elements simultaneously;
   a base structure for supporting said primer elements, said base structure having a base surface means including a recess into which said annular surface of said impact member is movable; and
   said recess having first portions and second portions, said first portions of said recess being arranged in a circular array and containing said primer elements, said second portions of said recess having arcuate shapes and extending circumferentially between said first portions.

2. An igniter assembly as defined in claim 1, wherein said annular surface of said impact member has circumferentially spaced first surface portions movable against said primer elements and circumferentially spaced second surface portions movable into said second portions of said recess.

3. An igniter assembly as defined in claim 1, wherein said annular surface of said impact member is movable into said recess into a position abutting surfaces of said base structure in said second portions of said recess.

4. An igniter assembly for a vehicle occupant safety apparatus including a containing means for receiving gas and a combustible material which burns to heat the gas, said igniter assembly comprising:
   an ignitable material for initiating burning of the combustible material when said ignitable material is ignited;
   a plurality of primer elements which are actuatable to ignite said ignitable material in response to the application of force against said primer elements;
   a base means for supporting said primer elements, said base means including a base surface and a recess extending from said base surface, said recess containing said primer elements;
   an impact member which is movable to apply force against said primer elements to actuate said primer elements, said impact member having an impact surface facing said base surface and having a projection extending from said impact surface toward said primer elements, said impact member being movable into a position in which said projection extends into said recess and said impact surface abuts said base surface, whereby said base surface limits movement of said impact member against said primer elements;
   said base surface and said impact surface facing said base surface having first portions and second portions, said first portions of said recess being arranged in a circular array and containing said primer elements, said second portions of said recess having arcuate shapes and extending circumferentially between said first portions, said projection on said impact member being an annular projection with first surface portions movable against said primer elements and second surface portions movable into said second portions of said recess.

5. An igniter assembly as defined in claim 4 wherein said second portions of said recess have a depth measured from said base surface which is equal to the height of said annular projection measured from said impact surface, whereby said second portions of said recess receive said annular projection to limit movement of said impact member.

6. An assembly for use in a vehicle occupant safety apparatus including a containing means for containing gas and a combustible material which burns to heat the gas, said assembly comprising:
   a housing having a movable exterior wall portion and a rupturable exterior wall portion, said housing being closed by a hermetic seal;
   initiating means for initiating burning of the combustible material, said initiating means including an ignitable material contained within said housing, said ignitable material, when burning, producing combustion products which rupture said rupturable exterior wall portion of said housing to open said housing;
   a plurality of primer elements contained within said housing, said primer elements being actuatable to ignite said ignitable material in response to the application of force against said primer elements;
   a impact member contained within said housing, said impact member being movable against each of said plurality of primer elements simultaneously to actuate said plurality of primer elements simultaneously in response to movement of said movable exterior wall portion of said housing against said impact member; and
   actuator means including an actuator member located outside said housing, said actuator member being movable against said housing to move said movable exterior wall portion of said housing against said impact member.

7. An assembly as defined in claim 6 wherein said impact member is movable against said primer elements in a first direction, and further comprising a base member contained within said housing, said base member supporting said primer elements in positions adjacent to said impact member and having a first blocking surface means facing said impact member, said impact member having a second blocking surface means facing said first blocking surface means, said second blocking surface means being movable into contact with said first blocking surface means upon movement of said impact member against said primer elements, said first and second blocking surface means blocking a flow of the gas from said primer elements in a second direction opposite to said first direction when in contact with each other.

8. An assembly as defined in claim 7 wherein said first blocking surface means comprises a planar surface of said base member which surrounds said plurality of primer elements.

9. An assembly as defined in claim 8 wherein said second blocking surface means comprises a planar surface of said impact member.

* * * * *

UNITED STATES PATENT AND TRADEMARK OFFICE
CERTIFICATE OF CORRECTION

PATENT NO. : 5,226,667
DATED : July 13, 1993
INVENTOR(S) : Terrance J. Coultas

It is certified that error appears in the above-indentified patent and that said Letters Patent is hereby corrected as shown below:

Column 12, line 17, after "surface" insert -- being planar surfaces; and said recess --.

Signed and Sealed this

Eighth Day of February, 1994

Attest:

BRUCE LEHMAN

*Attesting Officer*  Commissioner of Patents and Trademarks